United States Patent [19]

Noda

[11] Patent Number: 5,123,609
[45] Date of Patent: Jun. 23, 1992

[54] TWO-BEARING REEL

[75] Inventor: Hideo Noda, Sakai, Japan

[73] Assignee: Shimano, Inc., Osaka, Japan

[21] Appl. No.: 511,264

[22] Filed: Apr. 23, 1990

[30] Foreign Application Priority Data

Apr. 22, 1989 [JP] Japan .................. 1-47537[U]

[51] Int. Cl.5 ............................................ A01K 89/015
[52] U.S. Cl. ................... 242/261; 242/312; 242/321
[58] Field of Search ............... 242/261, 312, 321, 322, 242/257, 258, 259, 260

[56] References Cited

U.S. PATENT DOCUMENTS

| | | | |
|---|---|---|---|
| 1,402,811 | 1/1922 | Upton | 242/259 X |
| 2,458,298 | 1/1949 | Polevoy | 242/312 |
| 3,284,020 | 11/1966 | Policansky | 242/312 X |
| 3,968,943 | 7/1976 | Murvall | 242/321 X |
| 4,131,245 | 12/1978 | Noda | 242/270 |
| 4,179,084 | 12/1979 | Noda | 242/261 |
| 4,379,530 | 4/1983 | Kobayashi | 242/261 |
| 4,394,991 | 7/1983 | Noda | 242/321 |
| 4,579,296 | 4/1986 | Karlsson et al. | 242/261 |

FOREIGN PATENT DOCUMENTS 50-21392 7/1975 Japan.

Primary Examiner—Daniel P. Stodola
Assistant Examiner—William G. Battista, Jr.
Attorney, Agent, or Firm—Dickstein, Shapiro & Morin

[57] ABSTRACT

A two-bearing reel comprises a first side plate and a second side plate opposed to each other, a spool shaft carrying a spool and rotatably supported between the first and second side plates, the spool shaft including an extension projecting outwardly from a bearing supported by the first side plate, a master gear driven by a handle, a pinion gear meshed with the master gear and slidably supported on the extension, and a clutch provided between the spool shaft and pinion gear. The clutch includes engaging projections provided on the spool shaft and engaging grooves provided on the pinion gear. The bearing has an inside portion secured to the spool shaft, and an outside portion supported to be movable relative to the first side plate.

4 Claims, 2 Drawing Sheets

TWO-BEARING REEL

BACKGROUND OF THE INVENTION

1. Field of the Invention

This invention relates to two-bearing reels.

2. Description of the Prior Art

A known reel of this type, as shown in Japanese Utility Model Publication No. 57-39027, comprises a first side plate, a second side plate, and a spool shaft rotatably supported by the two side plates through bearings, the spool shaft having one end extending outwardly of the first side plate disposed adjacent a handle. This outward extension carries a pinion gear to be rotatable and axially slidable; which pinion gear is meshed with a master gear driven by the handle. The pinion gear has an end face opposed to the first side plate and defining an elliptic clutch opening having parallel dihedrals or widths across flats. The spool shaft defines a clutch barrel having dihedrals engageable with this clutch opening. A torque produced by operating the handle is transmitted to the spool through engagement between clutch barrel and clutch opening, while the spool is made freely rotatable when the engagement therebetween is broken.

The known construction noted above is capable of minimizing deflection of the spool shaft between the first and second side plates, and of carrying out the clutching function for making and breaking the torque transmission. However, the bending stress of the spool shaft tends to concentrate on the clutch barrel since the clutch barrel has parallel dihedrals or width across flats formed by cutting peripheral surfaces of the spool shaft so that the clutch barrel has a substantially reduced sectional area compared with an adjacent sectional area. Thus, when a great reaction force acts on the teeth of the master gear and pinion gear with engagement of the two gears, the spool shaft becomes deformed which could impair the engagement between the two gears.

Japanese Patent Publication No. 50-21392, for example, shows a different reel which has no such drawback relating to the spool shaft. According to this publication, the spool shaft includes a pin projecting diametrically outwardly therefrom, and the pinion gear defines slot (or engaging grooves) for engagement with the pin. Torque transmission between the pinion gear and spool shaft is made or broken by engaging and disengaging the pin and slot.

In fishing, generally, a suitable fishing line is selected according to the type or size of fish to be caught. It is desirable to change fishing lines as wound on respective spools. The spool shaft normally is removably inserted through the second side plate toward the first side plate because the first side plate has a complicated construction with a drive mechanism including the master gear driven by a handle operation and the pinion gear for meshing with the master gear.

Of the two known constructions noted above, the latter has the advantage of increased strength of the spool shaft over the former. However, if in the latter construction the spool shaft rotatably supported by the first and second side plates were removable through the second side plate, the pin projecting from peripheries of the spool shaft would be blocked by an end face of the bearing fixed to the first side plate and unable to pass through the axial bore of the bearing. Therefore, the spool fixedly mounted on the spool shaft would not be readily removable from the reel. This poses a problem that the spool is not easily interchangeable for changing fishing lines.

SUMMARY OF THE INVENTION

The present invention has been made having regard to the disadvantages of the prior art noted above. An object of the invention is, therefore, to provide a two-bearing reel having a spool supported between a first side plate and a second side plate, which has a simple construction without reducing the strength of the spool shaft and which allows the spool to be removed easily, without obstruction by the bearings of the spool shaft, to be replaced with one carrying a fishing line suited for a particular fishing situation.

In order to achieve the above object, a two-bearing reel according to the present invention comprises a first side plate and a second side plate opposed to each other, a spool shaft carrying a spool and rotatably supported between the first and second side plates, the spool shaft including an extension projecting outwardly from a bearing supported by the first side plate, a master gear driven by a handle, a pinion gear meshed with the master gear and slidably supported on the extension, and a clutch provided between the spool shaft and pinion gear. The clutch includes engaging projections provided on the spool shaft and engaging grooves provided on the pinion gear. The bearing has an inside portion secured to the spool shaft, and an outside portion supported to be movable relative to the first side plate.

In the reel as constructed above, the spool shaft undergoes little deflection between the first and second side plates since the spool shaft is rotatably supported by and between the two side plates. Further, since the engaging projections and grooves constitute a clutch for transmitting rotation of the pinion gear to the spool shaft, the spool shaft need not define a clutch barrel with dihedrals or width across flats as in the prior art. This construction has the advantage of avoiding a stress concentration on the spool shaft.

On the other hand, the inside portion of the bearing is secured to the spool shaft, and the outside portion thereof supported to be movable relative to the first side plate. Consequently, although the spool shaft includes engaging projections, these projections need not be passed through the inside portion of the bearing for changing the spool. The bearing per se may be drawn out with the spool shaft through the second side plate, which involves movement of the outside portion of the bearing relative to the first side plate.

The two-bearing reel according to the present invention, as described above, minimizes the deflection of the spool shaft between the first and second side plates, and does not reduce the strength of the spool shaft since the clutch for transmitting the operating force of the master gear from the pinion gear to the spool shaft comprises the engaging projections provided on the spool shaft and engaging grooves defined in the pinion gear. Moreover, the construction in which the inside portion of the bearing is secured to the spool shaft, with the outside portion thereof supported to be movable relative to the first side plate, allows the spool shaft to be readily removable with the spool through the second side plate without being obstructed by the bearing. This two-bearing reel has a simple and inexpensive construction though allowing the spool shaft to be removably mounted therein.

Other objects, features and advantages of the present invention will be apparent from the following description.

DETAILED DESCRIPTION OF THE PREFERRED EMBODIMENT

A two-bearing reel embodying the present invention will be described in detail hereinafter with reference to the drawings.

Figure 1:
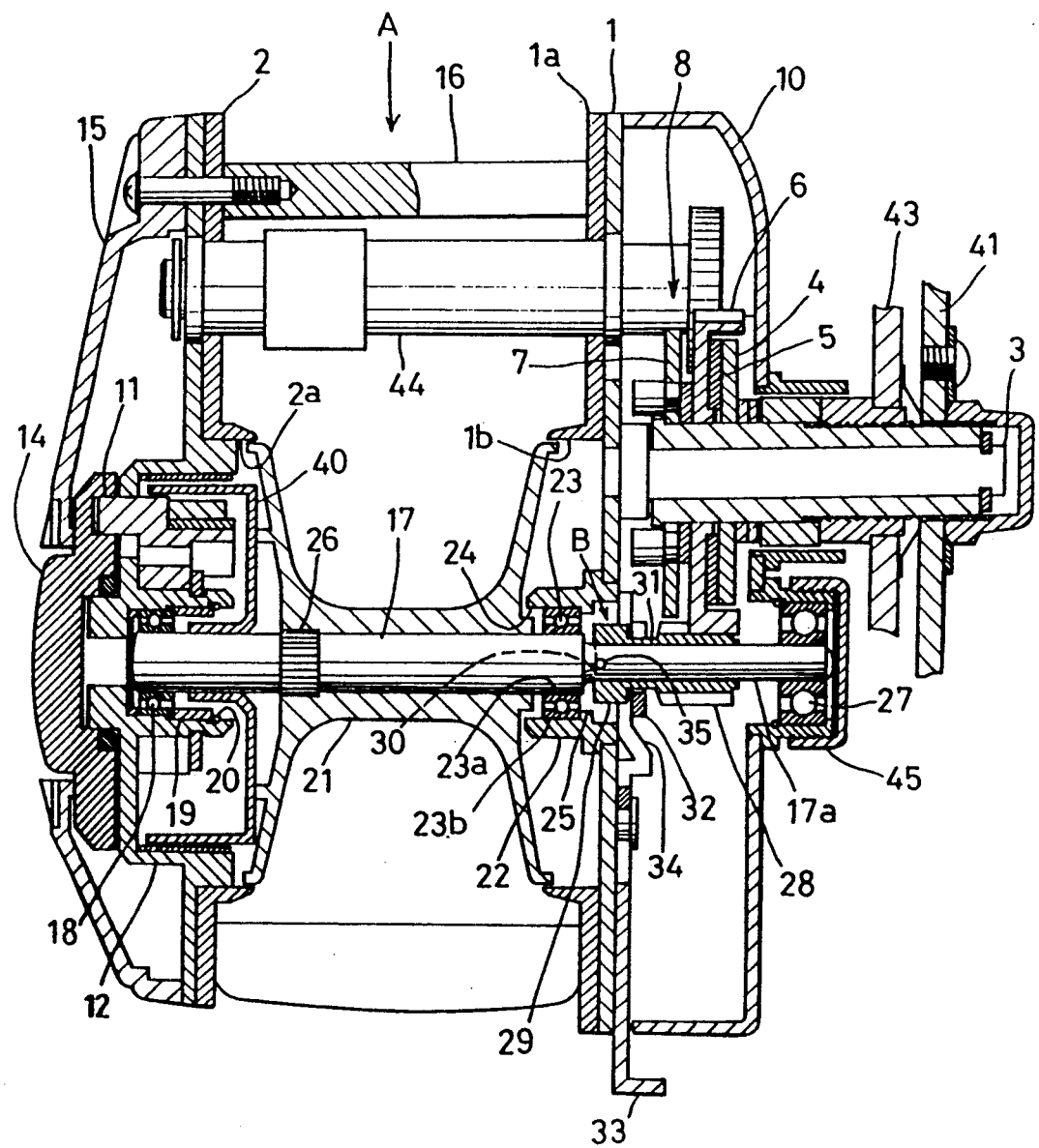
FIG. 1 is a sectional front view of a two-bearing reel according to the present invention.

Referring to FIG. 1, the reel comprises a first side plate 1 and a second side plate 2 opposed to each other. A mechanical housing 10 containing a drive mechanism 8 is provided outwardly of the first side plate 1. The drive mechanism 8 includes a disk 4, a friction plate 5, a master gear 6 and a return plate 7 supported on a handle shaft 3. The second side plate 2 has a brake case 12 supporting a magnet brake mechanism 11. An outer housing 15 is provided outwardly of the brake case, with a control knob 14 exposed through an opening of the outer housing 15 for controlling the magnet brake mechanism 11. A doubling plate 1a is provided on an inside surface of the first side plate 1. Tubular portions 1b and 2a project inwardly from the doubling plate 1a and the second side plate 2, respectively, for loosely engaging outer peripheries of flanges formed on opposite ends of a spool 21 to be described later. Connecting rods 16 extend between the doubling plate 1a and second side plate 2. These connecting rods 16 maintain a spacing between the two side plates 1 and 2 to define a reel body A. The spool 21 is mounted on a spool shaft 17 supported at one end thereof by a bearing 18 fitted in an inside peripheral wall of the brake case 12. The spool shaft 17 is locked against axial movement by a collar 19 and a stopper ring 20.

A tubular bearing case 22 is secured to an inside wall of the first side plate 1. The bearing case 22 defines an engaging inside surface 24 which allows axial movement of an outer race 23b defined peripherally of a bearing 23 comprising a ball bearing. The bearing case 22 includes a stepped constriction 25 at an outer end of the inside surface 24 for limiting outward axial movement of the bearing 23. The bearing 23 for fitting in the bearing case 22 is not limited to the ball bearing but may comprise various other bearings such as a roller bearing.

The spool 21 on which a fishing line is wound is rigidly connected to the spool shaft 17 by a fixing device 26. The spool shaft 17 is rotatably supported at one end thereof by the second side plate 2 through the bearing 18 and brake case 12. The other end of the spool shaft 17 carries an inner race 23a of the bearing 23 on an outer periphery thereof by means of a retaining device with an engagement tolerance (e.g. JIS Grade B0401P6). This construction rigidly connects the bearing 23 to the spool shaft 17, and allows the bearing 23 to be mounted in and removed from the bearing case 22 when the spool shaft 17 is changed.

The spool shaft 17 includes an outward extension 17a extending outwardly of the bearing 23. This outward extension 17a has an extreme end thereof axially movably supported by a bearing 27 mounted in the mechanical housing 10. A pinion gear 28 is mounted on the outward extension 17a of the spool shaft 17 between the bearing 23 and bearing 27 to be rotatable and axially slidable for meshing with the master gear 6.

Figure 2:
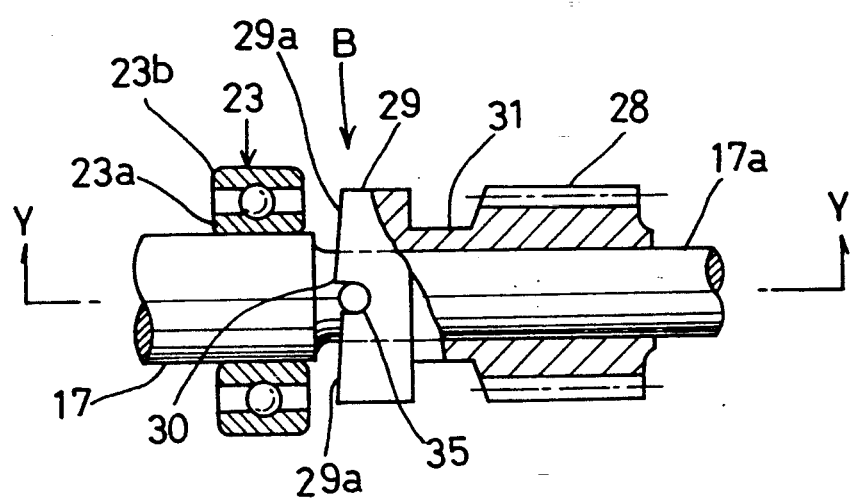
FIG. 2 is an enlarged sectional view of a principal portion of the reel.
Figure 3:
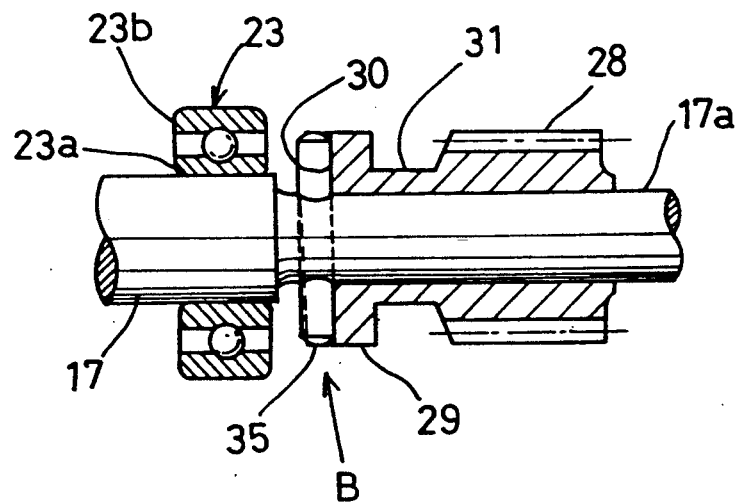
FIG. 3 is a section taken on line Y—Y of FIG. 2.

As shown in FIGS. 2 and 3, the pinion gear 28 includes a tubular clutch boss 29 formed integral therewith at a position opposed to the spool 21. The clutch boss 29 has the same diameter as an addendum circle of the pinion gear 28, which is smaller than the stepped constriction of the engaging inside surface 24 of the bearing case 22. The boss 29 defines engaging radial grooves 30 formed on an end face thereof opposed to the spool 21 and extending diametrically opposite from the axis of the boss 29. Further, a peripheral groove 31 is formed between the clutch boss 29 and pinion gear 28 for receiving a clutch yoke 32 supported by the first side plate 1. The clutch yoke 32 is operable through a side face thereof by a contact piece 34 of a clutch lever 33 including a control portion extending outwardly of the mechanical housing 10.

The end face of the clutch boss 29 further defines guide surfaces 29a displaced axially outwardly in the circumferential direction from edges of the engaging grooves 30, respectively.

The extension 17a of the spool shaft 17 fixedly carries an engaging pin extending therethrough at a position opposed to the engaging grooves 30 of the clutch boss 29. This pin has a thickness fitting with the engaging grooves 30, and defines engaging projections 35 which do not extend outwardly of the periphery of the clutch boss 29.

Numeral 40 in FIG. 1 denotes a tubular conductor acting as the magnet brake mechanism 11. Numeral 41 denotes a handle for applying a torque to the drive mechanism 8. Numeral 43 denotes an adjuster for adjusting a drag mechanism including the friction plate 5 and disk 4. Numeral 44 denotes a guide shaft for moving a guide element (not shown) when the fishing line is taken up on the spool 21. Numeral 45 denotes a cast control.

In this embodiment, the inner race 23a of the bearing 23 is held in position on the spool shaft 17 by a retaining device with an engagement tolerance (JIS Grade B0401P6) (interference fit). The retaining device is not limited to this example. An adhesive may be used between the periphery of shaft 17 and inside surface of inner race 23a, for example.

The way in which the two-bearing reel as constructed above operates will be described next.

To start fishing, the user operates the clutch lever 33 projecting from the mechanical housing 10 to disengage, a clutch B, i.e. disengage the projections 35 formed on the spool shaft 17 from the grooves 30 of the clutch boss 29 by means of the clutch yoke 32, thereby placing the spool 21 in a freely rotatable state, and casts the fishing line to an intended location on water surface. When a fish takes the bait, the user turns the handle 41 in the direction to take up the line, whereby the clutch lever 33 is automatically restored by the return plate 7 to engage the clutch B, i.e. engage the projections 35 and grooves 30. Then the torque of the handle 41 is transmitted to the spool 21 through the engagement between the master gear 6 of the drive mechanism 8 and the pinion gear 28 on spool shaft 17, thereby taking up the fishing line.

When the user wishes to catch a different type or size of fish, he or she may change the line wound on the spool 21 for a fishing line suited for the desired fish type or size. In this case, the device rigidly connecting the outer housing 15 to the reel body A is released to remove the outer housing 15 and the brake case 12 along with the magnet brake mechanism 11 and bearing 18 as mounted therein. Subsequently, the tubular conductor 40 fixed to the spool shaft 17, spool 21, and bearing 23 supported on the spool shaft 17 are pulled out together through the tubular portion 2a of the second side plate 2. At this time, the bearing 23 is readily removable with the spool shaft 17 instead of remaining in contact with the inside wall of the bearing case 22 on the first side plate 1 since the outer race 23b of the bearing 23 is axially slidably supported relative to the inside wall of the baring case 22 and the inner race 23a is secured to the spool shaft 17.

Moreover, this construction is formed simply by arranging the inner race 23a of the bearing 23 to be retained by the spool shaft 17. A retainer ring or the like is not required either. Further, since the engaging projections 35 and grooves 30 constitute the clutch, the spool shaft 17 need not define dihedrals or widths across flats as in the prior art. This construction avoids a stress concentration on the spool shaft 17.

When assembling the spool having a desired fishing line wound thereon to the reel, a sequence opposite to the removing sequence is followed. That is, the spool shaft 17 carrying the engaging projections 35, bearing 23, spool 21 and tubular conductor 40 is inserted through the tubular portion 2a of the second side plate 2, and moved inwardly until the outer race 23b of the bearing 23 contacts the constricted step 25 formed on the inside wall 24 of the bearing case 22. Thereafter the bearing 18 in the brake case 12 is fitted on the end of the spool shaft 17. Then the outer housing 15 and the brake case containing the magnet brake mechanism 11 are secured in position by means of the connecting device to complete the series of spool changing steps.

What is claimed is:

1. A two-bearing reel, comprising:
   a first side plate (1) and a second side plate (2) opposed to each other;
   a spool shaft (17) carrying a spool (21) and rotatably supported between said first and second side plates (1, 2), said spool shaft (17) including an extension (17a) projecting outwardly from a bearing (23) supported by said first side plate (1);
   a master gear (6) driven by a handle (41);
   a pinion gear (28) meshed with said master gear (6) and slidably supported on said extension (17a); and
   a clutch (B) provided between said spool shaft (17) and said pinion gear (28);
   wherein said clutch (B) includes engaging projections (35) provided on said extension (17a) of said spool shaft (17) and engaging grooves (30) provided on said pinion gear (28), and said bearing (23) has an inside portion (23a) secured to said spool shaft (17), and an outside portion (23b) supported to be movable relative to said first side plate (1);
   wherein said engaging projections (35) comprise pin-like projections with opposite ends, said clutch (B) being arranged such that said opposite ends of said pin-like projections (35) do not protrude from an outer periphery of said outside portion (23b) of said bearing (23); and
   wherein said inside portion (23a) of said bearing (23) has an inner diameter, and wherein said opposite ends of said pin-like projections (35) are spaced apart from each other by a distance which is greater than said inner diameter of said inside portion (23a) of said bearing (23).

2. A two-bearing reel as claimed in claim 1, wherein said bearing (23) comprises a ball bearing, with said inside portion (23a) defining an inner race and said outside portion (23b) defining an outer race.

3. A two-bearing reel as claimed in claim 2, wherein said inner race (23a) is secured to said spool shaft (17) by interference fit.

4. A two-bearing reel as claimed in claim 2, wherein said inner race (23a) is secured to said spool shaft (17) by an adhesive.

* * * * *